US009689407B2

(12) United States Patent
Junginger

(10) Patent No.: US 9,689,407 B2
(45) Date of Patent: Jun. 27, 2017

(54) HYDRAULIC DRIVE WITH RAPID STROKE AND LOAD STROKE

(71) Applicant: Voith Patent GmbH, Heidenheim (DE)

(72) Inventor: Magnus Junginger, Leonberg-Warmbronn (DE)

(73) Assignee: Voith Patent GmbH, Heidenheim (DE)

( * ) Notice: Subject to any disclaimer, the term of this patent is extended or adjusted under 35 U.S.C. 154(b) by 116 days.

(21) Appl. No.: 14/858,326

(22) Filed: Sep. 18, 2015

(65) Prior Publication Data

US 2016/0084278 A1 Mar. 24, 2016

(30) Foreign Application Priority Data

Sep. 19, 2014 (DE) ........................ 10 2014 218 885

(51) Int. Cl.
*F16D 31/02* (2006.01)
*F15B 11/17* (2006.01)
(Continued)

(52) U.S. Cl.
CPC ............ *F15B 11/17* (2013.01); *B30B 15/161* (2013.01); *F15B 1/04* (2013.01); *F15B 11/022* (2013.01); *F15B 13/06* (2013.01); *F15B 11/036* (2013.01); *F15B 2211/20538* (2013.01); *F15B 2211/20561* (2013.01); *F15B 2211/20576* (2013.01); *F15B 2211/27* (2013.01); *F15B 2211/30525* (2013.01); *F15B 2211/30565* (2013.01); *F15B 2211/321* (2013.01); *F15B 2211/327* (2013.01); *F15B 2211/329* (2013.01); *F15B 2211/625* (2013.01); *F15B 2211/7055* (2013.01); *F15B 2211/775* (2013.01)

(58) Field of Classification Search
CPC ............ F15B 15/18; F15B 2211/20561; F15B 2211/7053; F15B 2211/785; F15B 15/17
USPC ........................................... 60/475, 476, 473
See application file for complete search history.

(56) References Cited

U.S. PATENT DOCUMENTS 6,003,429 A * 12/1999 Nakabayashi .......... B30B 1/323
60/560

FOREIGN PATENT DOCUMENTS

| | | |
|---|---|---|
| DE | 199 14 840 A1 | 10/2000 |
| EP | 1 288 507 A2 | 3/2003 |

OTHER PUBLICATIONS

German Office Action dated May 28, 2015 for German Application No. 10 2014 218 885.7 (6 pages).

* cited by examiner

*Primary Examiner* — Thomas E Lazo
*Assistant Examiner* — Daniel Collins
(74) *Attorney, Agent, or Firm* — Taylor IP, P.C.

(57) ABSTRACT

A hydraulic drive including a first differential cylinder that includes a first and a second pressure chamber and a first piston that separates the first from the second pressure chamber and having two pumps delivering in opposite direction. The hydraulic drive further includes a second differential cylinder that includes a first and a second pressure chamber and a second piston that separates the first pressure chamber from the second pressure chamber, and a directional control valve that has a first and a second switching position. The pumps in the first switching position are respectively hydraulically connected via pressure chambers of the first differential cylinder that are different from each other and whereby the pumps in the second switching position are respectively connected via pressure chambers of the second differential cylinder that are different from each other.

15 Claims, 1 Drawing Sheet

(51) Int. Cl.

| | |
|---|---|
| ***F15B 1/04*** | (2006.01) |
| ***F15B 13/06*** | (2006.01) |
| ***F15B 11/02*** | (2006.01) |
| ***B30B 15/16*** | (2006.01) |
| *F15B 11/036* | (2006.01) |

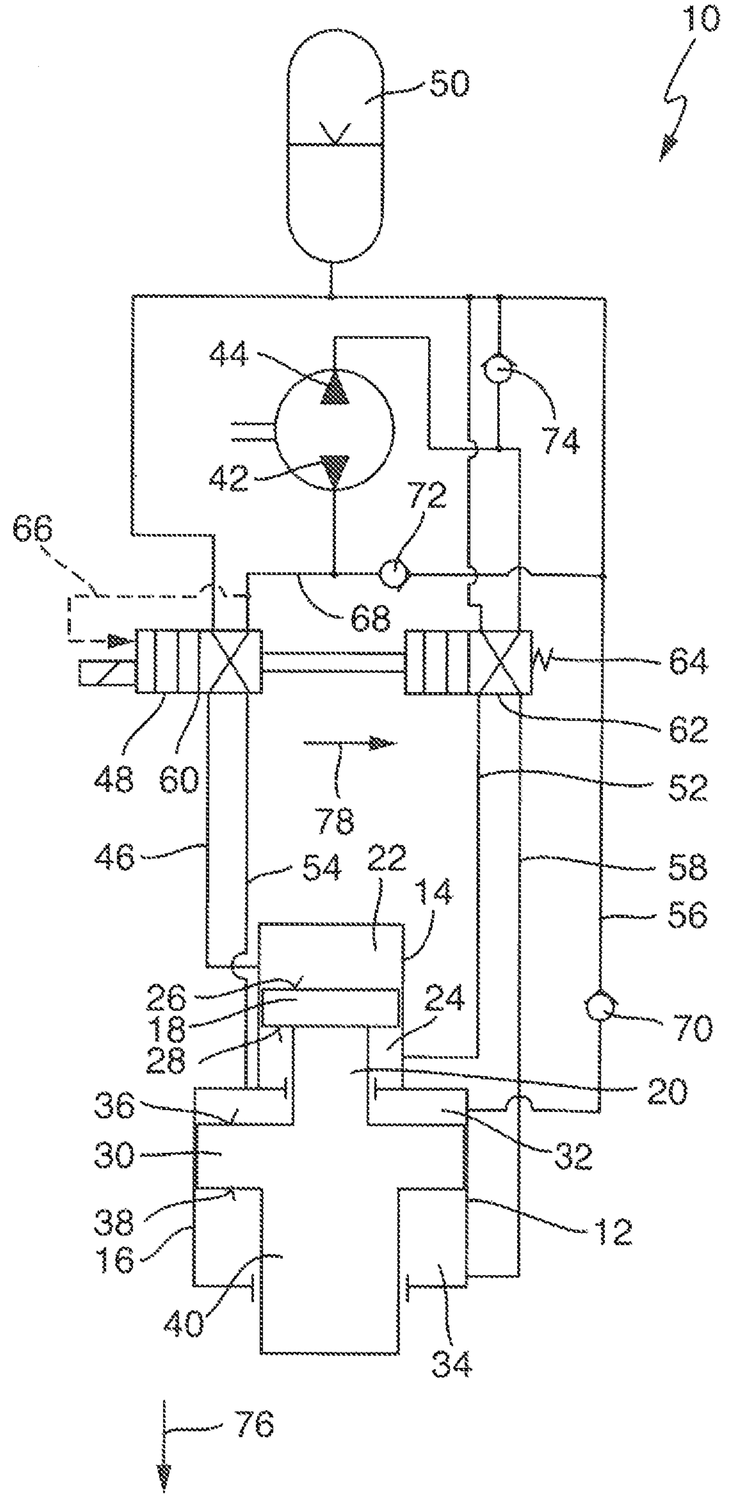
10
50
44
74
42
72
66
68
64
48
60
62
78
52
46
54
22
58
14
56
26
18
24
70
28
20
36
32
30
38
12
16
40
34
76

HYDRAULIC DRIVE WITH RAPID STROKE AND LOAD STROKE

BACKGROUND OF THE INVENTION

1. Field of the Invention

The present invention relates to a hydraulic drive and, more particularly, to a hydraulic drive for a hydraulic press. The invention moreover relates to a method for operating such a drive.

2. Description of the Related Art

Hydraulic drives are well known from the current state of the art. In practice it is desirable for hydraulic drives, in particular for hydraulic drives for hydraulic presses, to provide a hydraulic drive that on the one hand provides a rapid movement of a drive piston with low force in a so-called rapid stroke or rapid movement, and with which on the other hand a slower action with great force is possible in a so-called load stroke or load movement.

Various drives are known for this purpose from the current state of the art. In one drive with a so-called throttle control, a pump is driven by a motor at constant speed. The control and changeover between rapid stroke and load stroke through control of the volume flow occurs hereby via flow resistances, for example valves. A disadvantage of such a drive with throttle control is the low efficiency due to the occurring flow losses.

Drives having a so-called displacement control system are moreover known from the current state of the art. A drive of this type may for example comprise a variable speed motor that drives two pumps having opposite delivering directions. The two pumps are connected via a hydraulic cylinder in such a way that the pump takes in hydraulic oil from one piston chamber of a hydraulic cylinder, whereas it moves hydraulic oil into the other piston chamber. The changeover from rapid stroke to load stroke, or respectively the speed control of the hydraulic drive occurs through changing of the displacement volume of the pump or respectively through the change in speed of the motor. A disadvantage of such a drive with the displacement control system is that the motor must have a higher speed for the high speed in the rapid stroke, whereas a high maximum torque is required for the high force in the load stroke mode. When using a fixed displacement pump, the motor must be designed accordingly because of this high so-called peak performance and therefore it becomes large, heavy, slow and expensive.

What is needed in the art is a hydraulic drive that avoids efficiency losses and whereby the motor should be able to be produced cost effectively.

SUMMARY OF THE INVENTION

The present invention provides a hydraulic drive that can be operated in a rapid stroke and a load stroke mode.

The hydraulic drive according to the present invention can include a second differential cylinder that includes a first and a second pressure chamber and a piston that separates the first pressure chamber from the second pressure chamber. The hydraulic drive also includes a directional control valve that has a first and a second switching position, whereby the pumps in the first switching position are respectively hydraulically connected via pressure chambers of the first differential cylinder that are different from each other and whereby the pumps in the second switching position are respectively connected via pressure chambers of the second differential cylinder that are different from each other.

In the first switching position of the directional control valve, the first differential cylinder can be actively moved when the two pumps move hydraulic fluid into the first pressure chamber and out of the second pressure chamber of the first differential cylinder. In the second switching position the second differential cylinder can in turn be actively moved when the two pumps move hydraulic fluid into the first pressure chamber and out of the second pressure chamber of the second differential cylinder.

The first pressure chambers and the second pressure chambers of the differential cylinders can have hydraulic effective surfaces, whereby the effective surfaces of the first pressure chambers are larger than the effective surfaces of the second pressure chambers. If the hydraulic effective surfaces of the differential cylinders are selected to be of different sizes, a hydraulic cylinder can then be provided whose hydraulic effective surfaces are of different sizes.

The hydraulic effective surfaces of the second differential cylinders may be larger than the hydraulic effective surfaces of the first differential cylinder. The second differential cylinder can hereby have a larger piston diameter than the first differential cylinder. With a hydraulic drive of this type a changeover from rapid stroke to load stroke can be provided when switching the directional control valve from the first switching position into the second switching position. When the pumps in the first switching position initially move hydraulic fluid into and out of the pressure chambers of the first differential cylinder, hydraulic fluid simply has to be applied to the smaller hydraulic effective surfaces of the first differential cylinders. The first differential cylinder can be moved in rapid stroke mode. When the pumps in the second switching position again move hydraulic fluid out of and into the pressure chambers of the second differential cylinder, the larger hydraulic effective surfaces of the second differential cylinder must be supplied with hydraulic fluid. The second differential cylinder can then be moved by a load stroke at an increased forced compared to the rapid stroke.

The surface ratio of the hydraulic effective surfaces of the first pressure chambers relative to the hydraulic effective surfaces of the second pressure chambers of the two differential cylinders may be identical or almost identical. This means that the ratio of the hydraulic effective surface of the first pressure chamber relative to the hydraulic effective surface of the second pressure chamber of the first differential cylinder is approximately consistent with the ratio of the hydraulic effective surface of the first pressure chamber relative to the hydraulic effective surface of the second pressure chamber of the second differential cylinder. A surface ratio of the hydraulic effective surfaces of the second differential cylinder relative to the hydraulic effective surfaces of the first differential cylinder in the range of approximately 2:1 to approximately 10:1 may be provided. This means that a two-to-tenfold power transmission can be realized.

Another arrangement of the hydraulic drive provides that the delivery volumes of the pumps are adapted to the surface ratio of the hydraulic effective surfaces of the pressure chambers. The first pump may provide a greater delivery volume than the second pump. The ratio of the delivery volumes may then be selected to be identical or almost identical to the surface ratio of the hydraulic effective surfaces. A hydraulic drive can thus be provided wherein—independent of the switching position of the directional control valve—hydraulic fluid can actively be moved into the first pressure chambers of the differential cylinders, and hydraulic fluid can actively be moved out of the first pressure chambers of the differential cylinders at a rotational direction of a servo motor driving the pumps. The hydraulic fluid necessary for filling and emptying the pressure chambers can thus largely be provided by the pumps.

Another embodiment of the hydraulic drive can provide that the pistons of the two differential cylinders are mechanically movably coupled. It may be provided herein that the differential cylinders are arranged serially aligned with each other whereby the piston rods of the differential cylinders are connected with each other, for example welded together. Or, it is however also conceivable to arrange the differential cylinders parallel to each other and to provide a moving coupling, for example, by a yoke arranged on both pistons, or a pressing tool arranged on the pistons. When extending the first differential cylinder in the first switching position, the second differential cylinder can also be extended during rapid stroke without having to actively apply hydraulic fluid to the second differential cylinder. The second differential cylinder is thus moved during rapid stroke.

A tank or pressure tank may be provided that can be connected hydraulically with the pumps and/or the pressure chambers of the differential cylinders. Excess hydraulic fluid can be diverted into such a tank or pressure tank.

In a further development of the hydraulic drive, the directional control valve may be designed as an 8/2 directional control valve. This means that the directional control valve comprises eight controlled connections and two switching positions. It is however also conceivable to provide a 4/2 directional control valve for realization of such functionality which respectively would have four controlled connections and two switching positions and whose control elements (valve pistons) are connected with each other, in particular mechanically coupled. The directional control valve shifts against the force of a return spring. If two 4/2 directional control valves are provided they can be coupled with each other in such a way that switching from the first into the second switching position occurs simultaneously or almost simultaneously.

The directional control valve can be switched hydraulically or electronically, depending on a pressure limit in the first pressure chamber of the first or second differential cylinder or if the directional control valve can be mechanically switched, depending on a position of the pistons of the differential cylinders. For hydraulic switching, a feedback of the pressure in the first pressure chamber of the first or second differential cylinder can be provided according to the current switching position of the directional control valve. If the directional control valve is in the first switching position, the pressure in the first pressure chamber of the first differential cylinder is fed back. A changeover from rapid stroke to load stroke can thus be achieved. If again, after completion of the load stroke the directional control valve is in the second switching position, the pressure in the first pressure chamber of the second differential cylinder can be fed back for shifting. After completion of the load stroke the directional control valve can again be moved—spring actuated—into the first switching position, so that on reversing the delivery directions of the two pumps, the two pistons that are mechanically coupled with each other can be moved in a rapid return stroke into their starting position. In this case the first pump moves hydraulic fluid from the first pressure chamber of the first differential cylinder and the second pump moves hydraulic fluid into the first pressure chamber of the first differential cylinder. During the upward motion of the first differential cylinder the second differential cylinder is then moved along passively, due to the movable coupling. However an electric control of the directional control valve is also conceivable, whereby a measurement of the pressure can occur in the first pressure chamber of the first or second differential cylinder. For shifting from the first switching position into the second switching position a mechanical solution may also be provided, whereby it is conceivable to shift the valve through the provision of a switch cam, depending on current operating positions.

An additional arrangement of the hydraulic drive can include check-valves that are arranged such that cavitation in the pressure chambers of the differential cylinders can be avoided. If the hydraulic fluid that is made available by the pumps during operation is not sufficient to avoid vacuums, in other words if the ratio of the delivery volumes of the pumps deviates from the surface ratio of the first hydraulic effective surface relative to the second hydraulic effective surface, additionally required hydraulic fluid can subsequently be fed in.

A method according to the present invention can include a drive that includes a first differential cylinder having a first pressure chamber and a second pressure chamber and a piston that separates the first pressure chamber from the second pressure chamber. The drive also has a second differential cylinder having a first pressure chamber and a second pressure chamber and a piston that separates the first pressure chamber from the second pressure chamber, whereby the pistons of the two differential cylinders are coupled for movement. The drive moreover has two pumps, delivering in opposite directions and one directional control valve that has a first and a second switching position. Such a hydraulic drive moreover includes differential cylinders, whereby the second differential cylinder has a larger hydraulic effective surface than the first differential cylinder. The first pump moreover has a larger delivery volume than the second pump, whereby the ratio of the delivery volumes of the pump is adapted to the surface ratio of the hydraulic effective surfaces of the first and second pressure chambers of the differential cylinders.

In another method according to the present invention, the first pump—in the first switching position—moves hydraulic fluid into the first pressure chamber of the first differential cylinder and the second pump moves hydraulic fluid out of the second pressure chamber of the first differential cylinder, whereby in the second switching position the first pump moves hydraulic fluid into the first pressure chamber of the second differential cylinder and the second pump moves hydraulic fluid out of the second pressure chamber of the second differential cylinder.

With such a method the movably coupled pistons of the hydraulic drive can initially be moved in a rapid stroke if the directional control valve is moved into the first switching position, since the pumps only supply the small hydraulic effective surfaces of the first differential cylinder with hydraulic fluid. When the directional control valve is moved into the switching position the pumps supply again the larger hydraulic effective surfaces of the second differential cylinder, whereby the movement of the piston can be realized in a load stroke.

Another development of the method provides that, when exceeding a pressure limit in the first pressure chamber of the first differential cylinder, the directional control valve is switched from the first switching position into the second switching position. If, for example a pressing tool or stamping tool that is arranged on the piston of the differential cylinder and which can also be provided for movable coupling of the piston encounters an obstacle—for example a work piece—in a rapid stroke the pressure increases in the first pressure chamber of the first differential cylinder, so that the directional control valve is shifted into the second switching position, thus realizing a movement of the piston in a load stroke, whereby now the second differential cylinder is supplied with hydraulic fluid.

The directional control valve may be moved through spring actuation from the second switching position into the first switching position if falling below a reset pressure in the first pressure chamber of the second differential cylinder. After completion of the load stroke the pressure in the first pressure chamber of the first differential cylinder drops off. Due to the spring actuated reset of the directional control valve the valve can be moved back into its starting position, in other words into the first switching position.

After a reversal of the delivery direction of the pumps, the first pump in the first switching position may move hydraulic fluid out of the first pressure chamber of the first differential cylinder and the second pump may move hydraulic fluid into the second pressure chamber of the first differential cylinder. If the valve is moved back through spring actuation into the first switching position after completion of the load stroke a rapid return stroke can occur after the reversal of the delivery direction. The pressure chambers of the first differential cylinder are again being supplied with hydraulic fluid, causing the pistons of the first differential cylinder to be actively moved. The piston of the second differential cylinder is moved entirely passively due to the movable coupling with the piston of the first differential cylinder.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawing, wherein:

FIG. 1 illustrates a hydraulic circuit diagram of an embodiment of an inventive hydraulic drive.

Corresponding reference characters indicate corresponding parts throughout the single view. The exemplification set out herein illustrates one embodiment of the invention and such exemplification is not to be construed as limiting the scope of the invention in any manner.

DETAILED DESCRIPTION OF THE INVENTION

Referring now to the drawing, hydraulic drive 10 includes a cylinder arrangement that, as a whole, is identified with reference number 12. Cylinder arrangement 12 includes two hydraulic differential cylinders 14, 16 that are separated from each other. First differential cylinder 14 includes a piston 18 and a piston rod 20 that is connected with piston 18. Piston 18 separates differential cylinder 14 into a first pressure chamber 22 and in a second pressure chamber 24. On the side of first pressure chamber 22 the first differential cylinder 14 has a hydraulic effective surface 26, whereby first differential cylinder 14 has a hydraulic effective surface 28 on the side of second pressure chamber 24. Hydraulic effective surface 26 has a surface ratio of approximately 2:1 relative to hydraulic effective surface 28. However another surface ratio is also conceivable.

Second differential cylinder 16 also includes a piston 30 that separates the second differential cylinder 16 into a first pressure chamber 32 and a second pressure chamber 34. On the side of first pressure chamber 32, second differential cylinder 16 has a hydraulic effective surface 36, whereby second differential cylinder 16 has a hydraulic effective surface 38 on the side of second pressure chamber 34. Hydraulic effective surface 36 has a surface ratio of for example 2:1 relative to hydraulic effective surface 38. However, another surface ratio is also conceivable. This surface ratio is approximately consistent with the surface ratio of effective surface 26 relative to effective surface 28.

Piston 30 is connected with piston rod 20 of first differential cylinder 14. Consequently the two pistons 20, 30 of the two differential cylinders are mechanically coupled, movably by piston rod 20. Piston 30 is moreover connected with an additional piston rod 40. A tool, work piece or functional part of a machine that is not illustrated in the drawing, can be arranged on piston rod 40.

The hydraulic drive furthermore includes two hydraulic pumps 42, 44 that are illustrated in the drawing only as a "differential pump". The "differential pump" provides different delivery volumes at their respective outlets. The two pumps 42, 44 are driven by a hydraulic motor that is not illustrated and deliver in opposite direction. First pump 42 has a greater delivery volume than second pump 44. The delivery volume of first pump 42 is proportional to the delivery volume of second pump 44 at a ratio that is approximately consistent to the surface ratio of effective surfaces 26, 36 of first pressure chambers 22, 32 relative to effective surfaces 28, 38 of second pressure chambers 24, 34. The delivery volumes of pumps 42, 44 are thus adapted to the surface ratios of effective surfaces 26, 28, 36, 38.

First pressure chamber 22 of first differential cylinder 14 can be connected with first pump 42 or with a pressure tank 50 via a first hydraulic line 46 by a directional control valve 48 that has a first and a second switching position. Second pressure chamber 24 of first differential cylinder 14 can be connected with second pump 44 or with pressure tank 50 via a second hydraulic line 52.

First pressure chamber 32 of second differential cylinder 16 can be connected with pressure tank 50 or with first pump 42 via a third hydraulic line 54. Moreover, first pressure chamber 32 of second differential cylinder 16 can be connected with pressure tank 50 via a fourth hydraulic line 56. Second pressure chamber 34 of second differential cylinder 16 can be connected with pressure tank 50 or with second pump 44 via a fifth hydraulic line 58.

Directional control valve 48 can be designed as an 8/2 directional control valve. This means that the directional control valve 48 includes eight controlled connections and two switching positions. In the current example, directional control valve 48 is realized through two 4/2 directional control valves 60, 62 that are coupled with each other. Directional control valve 48, or respectively directional control valves 60, 62 can be switched from the first switching position that is illustrated in the drawing against a reset force of spring 64, into a second switching position. The switching elements (valve pistons) of directional control valves 60, 62 are mechanically coupled with each other. As shown in FIG. 1, directional control valve 48 is hydraulically controlled, in that the hydraulic pressure that is present in hydraulic line 68 is fed back via a control line 66. Depending upon the switching position of directional control valve 48, hydraulic line 68 is connected either with hydraulic line 46 or with hydraulic line 54.

In order to avoid vacuums or cavitation, hydraulic drive 10 moreover comprises three check valves 70, 72 and 74.

Hydraulic drive 10 can operate as follows: when the non-illustrated servo motor drives pumps 42, 44 and the directional control valve 48 is in the first switching position shown in FIG. 1 then pump 42 moves hydraulic fluid into first pressure chamber 22 of first differential cylinder 14, whereby second pump 44 moves hydraulic fluid out of second pressure chamber 24 of first differential cylinder 14. First pressure chamber 32 of second differential cylinder 16 receives hydraulic fluid via check valve 70 or respectively via hydraulic line 56, whereas hydraulic fluid can flow from second pressure chamber 34 of second differential cylinder 16 into pressure tank 50. Consequently, pumps 42, 44 act in the first switching position only upon pressure chambers 22, 24 of first hydraulic differential cylinder 14. Due to the smaller hydraulic effective surfaces 26, 28 and the movable coupling by piston rod 20, the two pistons 18, 30 of both differential cylinders 14, 16 are moved downward in a rapid stroke, that is in the direction of arrow 76.

If piston rod 40 or respectively a press tool that is arranged on the piston rod encounters an obstacle, the pressure in first pressure chamber 22 of first differential cylinder 14, or respectively in hydraulic lines 46, 68 increases. If the pressure that is fed back via control line 66 increases to above a pressure limit that was preset via spring 64 of directional control valve 48, valve 48 is moved against the force of spring 64 into its second switching position toward the right, that is in the direction of arrow 78.

At a consistent delivery direction of pumps 42, 44 first pump 42 moves hydraulic fluid into first pressure chamber 32 of second differential cylinder 16, whereby second pump 44 moves hydraulic fluid out of second pressure chamber 34 of first differential cylinder 16. First pressure chamber 22 of first differential cylinder 14 received hydraulic fluid via hydraulic line 46 from pressure tank 50, whereas hydraulic fluid can flow from second pressure chamber 24 of first differential cylinder 14 via hydraulic line 52 into pressure tank 50. Consequently, in the second switching position pumps 42, 44 only act upon pressure chambers 32, 34 of second hydraulic differential cylinder 16. Because of the larger hydraulic effective surfaces 36, 38 and the movable coupling by piston rod 20, both pistons 18, 30 of the two differential cylinders 14, 16 are moved downward in a load stroke, that is in the direction of arrow 76. During the load stroke a slower movement occurs at greater force. A power transmission can be achieved through an appropriate selection of the surface ratios. If, for example effective surfaces 36, 38 of second differential cylinder 16 are ten times larger than effective surfaces 26, 28 of first differential cylinder 14, a power transmission of 10:1 can be realized.

After completion of a load stroke the pressure in first pressure chamber 32 of second differential cylinder 16, or respectively in hydraulic lines 54, 68 drops. If the pressure drops below a predefined reset pressure of directional control valve 48 then the valve is moved again by the spring force of spring 64 into its first switching position that is illustrated in FIG. 1.

Pumps 42, 44 are again hydraulically connected in the first switching position with pressure chambers 26, 28 of the first differential cylinder. If the delivery direction of pumps 42, 44 is reversed—for example by reversing the rotational direction of the motor that is not illustrated—then first pump 42 moves hydraulic fluid out of first pressure chamber 22 of first differential cylinder 14, whereby second pump 44 moves hydraulic fluid into second pressure chamber 24 of first differential cylinder 14. Second differential cylinder 16 does now not participate in the fluid exchange with pumps 42, 44. Due to the movable coupling by piston rod 20, pistons 18, 30 of the two differential cylinders can again be moved upward in a rapid return stroke, in the opposite direction to that indicated by arrow 76.

Thus, a displacement control system can be produced with the inventive hydraulic drive 10, whereby the drive can be operated in a rapid stroke and a load stroke, whereby efficiency losses can be avoided and whereby the drive can be produced cost effectively, since pumps 42, 44 can be sized comparatively small.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A hydraulic drive for a hydraulic press, said hydraulic drive comprising:

- a first pump and a second pump delivering in an opposite direction;
- a first differential cylinder, including:
  - a first pressure chamber and a second pressure chamber; and
  - a first piston that separates said first pressure chamber from said second pressure chamber;
- a second differential cylinder, including:
  - a first pressure chamber and a second pressure chamber; and
  - a second piston that separates the first pressure chamber from the second pressure chamber of the second differential cylinder; and
- a directional control valve that has a first switching position and a second switching position, wherein said first pump and said second pump in the first switching position are respectively hydraulically connected via said first pressure chamber and said second pressure chamber of the first differential cylinder, and wherein said first pump and said second pump in the second switching position are respectively connected via said first pressure chamber and said second pressure chamber of the second differential cylinder.

2. The hydraulic drive according to claim 1, wherein said first pressure chamber and said second pressure chamber of the first differential cylinder each have a respective hydraulic effective surface, and said hydraulic effective surface of said first pressure chamber of the first differential cylinder is larger than said hydraulic effective surface of said second pressure chamber of the first differential cylinder, wherein said first pressure chamber and said second pressure chamber of the second differential cylinder each have a respective hydraulic effective surface, and said hydraulic effective surface of said first pressure chamber of the second differential cylinder is larger than said hydraulic effective surface of said second pressure chamber of the second differential cylinder.

3. The hydraulic drive according to claim 2, wherein each respective hydraulic effective surface of the second differential cylinder is larger than each respective hydraulic effective surface of the first differential cylinder.

4. The hydraulic drive according to claim 2, wherein a surface ratio of said hydraulic effective surface of said first pressure chamber of the first differential cylinder and said hydraulic effective surface of said second pressure chamber of the first differential cylinder relative to said hydraulic effective surface of said first pressure chamber of the second differential cylinder and said hydraulic effective surface of said second pressure chamber of the second differential cylinder is substantially identical.

5. The hydraulic drive according to claim 2, wherein said first pump and said second pump each have a delivery volume that is adapted to a surface ratio of each respective hydraulic effective surface of the first differential cylinder and the second differential cylinder.

6. The hydraulic drive according to claim 1, wherein said first piston and said second piston are mechanically movably coupled.

7. The hydraulic drive according to claim 1, further including a tank that can be connected hydraulically with at least one of said first pump and said second pump, said first pressure chamber and said second pressure chamber of the first differential cylinder, and said first pressure chamber and said second pressure chamber of the second differential cylinder.

8. The hydraulic drive according to claim 1, wherein said directional control valve is an 8/2 directional control valve.

9. The hydraulic drive according to claim 1, wherein said directional control valve can be at least one of hydraulically and electronically switched, depending on a pressure limit in at least one of said first pressure chamber in the first differential cylinder and said first pressure chamber in the second differential cylinder.

10. The hydraulic drive according to claim 1, wherein said directional control valve can be mechanically switched, depending on a position of at least one of said first piston and said second piston.

11. The hydraulic drive according to claim 1, further including at least one check-valve arranged such that cavitation can be avoided in said first pressure chamber and said second pressure chamber of the first differential cylinder and in said first pressure chamber and said second pressure chamber of the second differential cylinder.

12. A method for operating a hydraulic drive having hydraulic fluid therein, said hydraulic drive including a first pump and a second pump delivering in an opposite direction, a first differential cylinder including a first pressure chamber and a second pressure chamber and a first piston that separates said first pressure chamber from said second pressure chamber of the first differential cylinder, a second differential cylinder including a first pressure chamber and a second pressure chamber and a second piston that separates the first pressure chamber from the second pressure chamber of the second differential cylinder, and a directional control valve that has a first switching position and a second switching position, wherein said first piston and said second piston are movably coupled, the method comprising the steps of:

actuating the first switching position so that said first pump moves hydraulic fluid into said first pressure chamber of the first differential cylinder and said second pump moves hydraulic fluid out of said second pressure chamber of the first differential cylinder; and actuating the second switching position so that said first pump moves hydraulic fluid into said first pressure chamber of the second differential cylinder and said second pump moves hydraulic fluid out of said second pressure chamber of the second differential cylinder.

13. The method according to claim 12, further including the step of switching said directional control valve from the first switching position into the second switching position when a pressure limit is exceeded in said first pressure chamber of the first differential cylinder.

14. The method according to claim 12, wherein the directional control valve is moved through a spring actuation from the second switching position into the first switching position if falling below a reset pressure in said first pressure chamber of the second differential cylinder.

15. The method according to claim 12, wherein after a reversal of a delivery direction of said first pump and said second pump in the first switching position, said first pump moves hydraulic fluid out of said first pressure chamber of the first differential cylinder and said second pump moves hydraulic fluid into said second pressure chamber of the first differential cylinder.

* * * * *